UNITED STATES PATENT OFFICE.

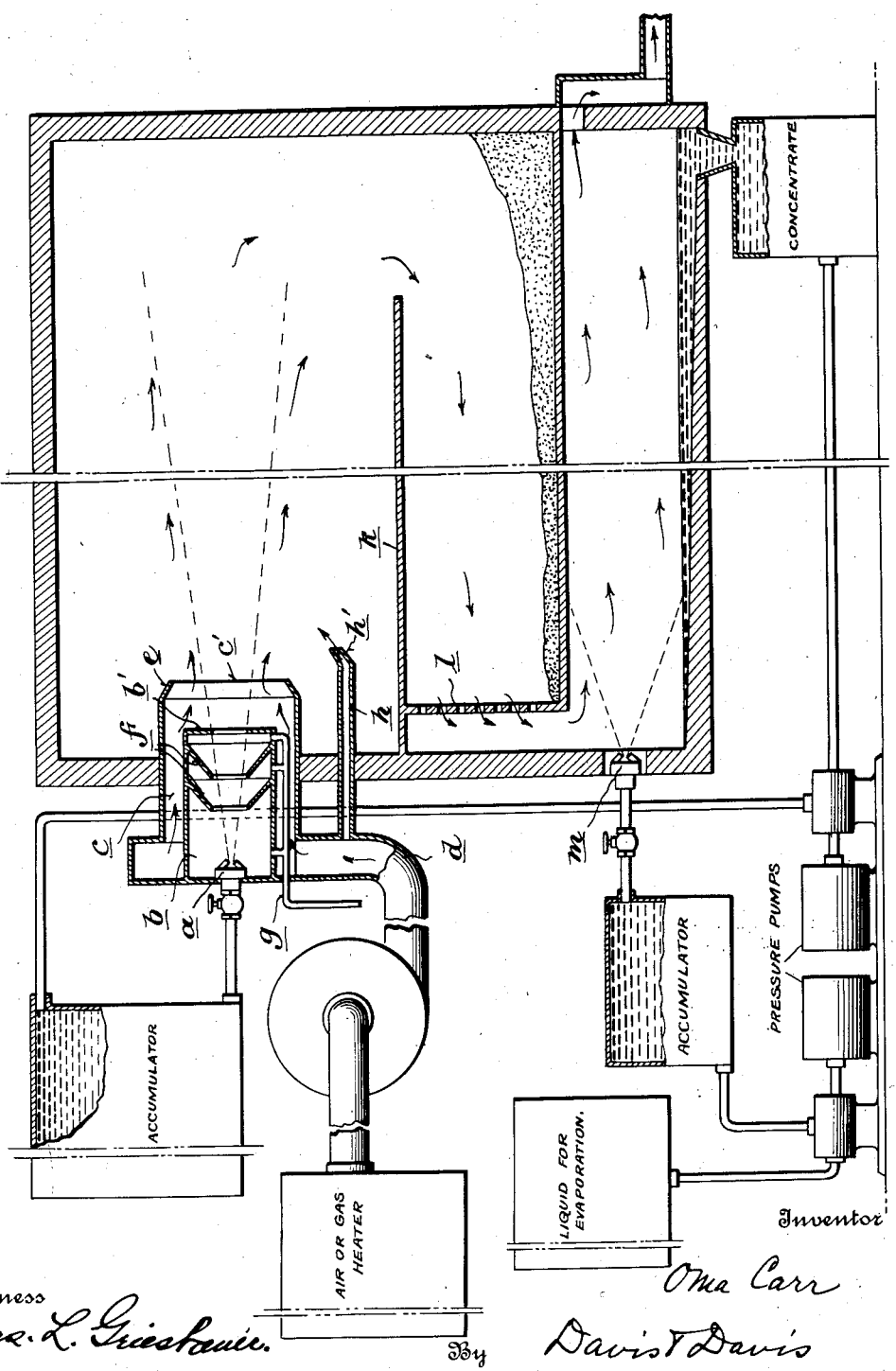

OMA CARR, OF NEW YORK, N. Y., ASSIGNOR TO THE CARDEM PROCESS COMPANY, OF NEW YORK, N. Y., A CORPORATION OF NEW YORK.

EVAPORATING APPARATUS.

1,405,756.          Specification of Letters Patent.     Patented Feb. 7, 1922.

Application filed September 12, 1916. Serial No. 119,745.

*To all whom it may concern:*

Be it known that I, OMA CARR, a citizen of the United States of America, and a resident of New York, county of New York, State of New York, have invented certain new and useful Improvements in Evaporating Apparatus, of which the following is a full and clear specification.

In evaporating water from liquids by atomizing the liquid into a body of heated gas, usually air, it is essential that the atomized particles, or spheres, of liquid be uniformly mixed with the gas which is to absorb the moisture. Inasmuch as 970 B. T. U. are required for the evaporation of one pound of water from air at 212° Fahr. (in the form of evaporator here considered) it is necessary that the pound of water shall be uniformly mixed with whatever volume of gas may contain the 970 B. T. U., in order that the heat required may be communicated to the water and effect its evaporation. Particularly is this the case where it is desired to evaporate a liquid containing solids (in solution or suspension) with the view of securing the solids in dry condition, as, in this case, a deficiency of heat communicated to one part of the spray will cause incomplete dryness of the particles at that point, and a whole product imperfect as to dryness.

Furthermore, I have found in practice that very great importance attaches to the manner in which the mixture of spray and air or other gas is accomplished, particularly where large capacities—say, 8 to 10 tons per hour of liquid through a single atomizer—are involved. Thus, where the atomizer throws its spray at a relatively wide angle—say, 40° to 50°—it is not possible to cut across the spray with a blast beneath the spray, as, in such case, there is caused merging of the minute spheres into large drops which evaporate too slowly. The best results are secured by causing the spray and heating air, or other gas, to mingle while travelling in practically the same direction and at approximately the same velocity.

To accomplish these results, both being vital to economic evaporation when evaporating to dryness, I employ the principle illustrated in the accompanying drawing which illustrates a vertical sectional view of an apparatus embodying one form of my invention. Referring thereto by reference characters, the liquid is atomized through atomizer $a$ of any suitable construction into a spray-rectifier or trimmer $b$, which is contained within an air-distributor $c$. Such spray as escapes from the end $b'$ of the spray-rectifier is caught by the air blast issuing from the end $c'$ of air distributor $c$, such air being derived from duct $d$. Through deflectors $e$ on air-distributor $c$, the air currents are turned inwards towards the longitudinal center line of the spray-rectifier, thus enclosing the cloud of spray issuing from the spray-rectifier and causing complete mixture of air and spray, both moving in approximately the same velocity and direction.

In the tubular spray-rectifier, circular rings $f$ may be placed, serving to eliminate the spray which is travelling at wide angle to the longitudinal center line of the spray-rectifier, the liquid so trapped out being returned through a pipe $g$ to storage or an atomizer-pump. The spray issuing from the spray-rectifier is thus made to travel almost parallel with the air currents in the air-distributor, and in practice I find practically no bombardment and coalescence among the spray particles.

It is found in practice that the spray-air mixture passing away from the air-distributor begins to diffuse some distance therefrom, such diffusion depending upon volume of air, velocity of air, size of chamber, and resistance to effluence. If the chamber into which the air-spray mixture is being driven has a small vertical section, it is desirable to cause the air-spray mixture to diffuse more rapidly in lateral directions than vertically; and this may be accomplished by placing a horizontal air current beneath or at one side of the mixture issuing from the air-distributor, as illustrated by duct $h$. The effect may be intensified by placing movable lips $h'$ on the duct, such lips serving to lift the air from duct $h$ into the mixture, causing the latter to diffuse more rapidly laterally than vertically. For some solutions, the drying-interval, i. e., the time required for the moisture to escape from the atomized particle, is such that, unless the distance from the floor $k$ to the longitudinal center line of spray-air mixture is considerable, diffusion may be so rapid that floor or ceiling, or both, may be brushed by incompletely dried particles; in such case, causing more rapid lateral diffusion will cause longer suspension and permit completion of drying before the particles touch the floor or ceiling.

It is obvious that the spray-rectifier need not be cylindrical, but may be square, rectangular, or even polygonal, in cross-section; and the air-distributor may be separate from the spray-rectifier and derive its air or other gas from a source different from duct *d*. The essential features are that the spray and heating air or other gas shall be brought together while moving in approximately the same direction and velocity, and mixture accomplished under such conditions. The spray-rectifier may be arranged internally in any desired manner to accomplish the purpose of delivering the spray in approximately parallel lines with the air currents from the air-distributor; and then causing mixture of spray and air under the conditions stated.

Having thus described my invention, what I claim is:

1. In a gas-evaporator, the combination of an atomizer, a spray rectifier associated therewith to trim the spray, and an air distributer associated with the spray rectifier, said rectifier consisting of a ring-like member surrounding the spray-stream and inclining away from the stream in the direction of its movement to thereby remove the caught particles of liquid away from the stream.

2. In a gas-evaporator, the combination of an atomizer, a spray rectifier associated therewith arranged to surround the spray and trim the same, and an air distributer associated with the rectifier, said rectifier embodying a ring-like member surrounding the spray-stream and extending laterally away from the stream to thereby remove the trimmed particles away from the stream.

3. In a gas-evaporator, the combination of a drying chamber, an atomizer arranged to deliver an atomized spray thereinto, means for supplying a drying gas, and a spray-rectifying means consisting of a chamber surrounding the atomized spray adjacent the nozzle and embodying a trimming member extending around the spray adapted to catch the wide-angled particles and convey them away from the spray-stream and deposit them in said latter chamber.

4. In a gas-evaporator, the combination of a drying chamber, an atomizer arranged to deliver an atomized spray thereinto, means for supplying a drying gas, and a spray-rectifying means consisting of a chamber surrounding the atomized stream adjacent the nozzle and embodying a plurality of members surrounding the spray stream at different points in such position as to catch the wide-angled particles and deliver them into said chamber.

5. In a gas evaporator, the combination of a drying-chamber, an atomizer arranged to deliver atomized spray thereinto from a source of supply, means for supplying drying gas, and a spray-trimmer surrounding the spray-stream and adapted to remove the wide-angled particles from such stream, a trap-chamber to receive the collected wide-angled particles from the trimmer, and means for conveying the trapped liquid back to the source.

In testimony whereof I hereunto affix my signature.

OMA CARR.